(12) United States Patent
Rangarajan Sridhar et al.

(10) Patent No.: US 9,734,820 B2
(45) Date of Patent: Aug. 15, 2017

(54) SYSTEM AND METHOD FOR TRANSLATING REAL-TIME SPEECH USING SEGMENTATION BASED ON CONJUNCTION LOCATIONS

(71) Applicant: Nuance Communications, Inc., Burlington, MA (US)

(72) Inventors: Vivek Kumar Rangarajan Sridhar, Morristown, NJ (US); Srinivas Bangalore, Morristown, NJ (US); John Chen, Millburn, NJ (US)

(73) Assignee: Nuance Communications, Inc., Burlington, MA (US)

( * ) Notice: Subject to any disclaimer, the term of this patent is extended or adjusted under 35 U.S.C. 154(b) by 132 days.

(21) Appl. No.: 14/080,361

(22) Filed: Nov. 14, 2013

(65) Prior Publication Data
US 2015/0134320 A1 May 14, 2015

(51) Int. Cl.
- G10L 13/00 (2006.01)
- G10L 15/04 (2013.01)
- G10L 15/26 (2006.01)
- G10L 15/00 (2013.01)
- G06F 17/27 (2006.01)
- G06F 17/28 (2006.01)

(52) U.S. Cl.
CPC ........ G10L 15/005 (2013.01); G06F 17/2775 (2013.01); G06F 17/289 (2013.01); G10L 13/00 (2013.01); G10L 15/04 (2013.01); G10L 15/26 (2013.01)

(58) Field of Classification Search
CPC .... G06F 17/27; G06F 17/2705; G06F 17/275; G06F 17/28; G10L 15/00; G10L 15/005; G10L 15/04; G10L 17/02

USPC ........................... 704/2, 4, 5, 6, 9, 231, 258
See application file for complete search history.

(56) References Cited

U.S. PATENT DOCUMENTS

| | | | |
|---|---|---|---|
| 6,161,082 A | 12/2000 | Goldberg et al. |
| 6,339,754 B1 | 1/2002 | Flanagan et al. |
| 6,442,524 B1 | 8/2002 | Ecker et al. |
| 6,928,407 B2 | 8/2005 | Ponceleon et al. |
| 6,980,953 B1 | 12/2005 | Kanevsky et al. |
| 6,996,520 B2 | 2/2006 | Levin |
| 7,398,215 B2 | 7/2008 | Mesbah et al. |

(Continued)

OTHER PUBLICATIONS

Shafran, I. and Richard Rose, "Robust Speech Detection and Segmentation for Real-Time ASR Applications," AT&T Labs Research, Jun. 3, 2003.

(Continued)

*Primary Examiner* — Richemond Dorvil
*Assistant Examiner* — Rodrigo Chavez (57) ABSTRACT

A system, method and computer-readable storage device which balance latency and accuracy of machine translations by segmenting the speech upon locating a conjunction. The system, upon receiving speech, will buffer speech until a conjunction is detected. Upon detecting a conjunction, the speech received until that point is segmented. The system then continues performing speech recognition on the segment, searching for the next conjunction, while simultaneously initiating translation of the segment. Upon translating the segment, the system converts the translation to a speech output, allowing a user to hear an audible translation of the speech originally heard.

17 Claims, 4 Drawing Sheets

(56) References Cited

U.S. PATENT DOCUMENTS

| | | |
|---|---|---|
| 7,496,512 B2 | 2/2009 | Zhao et al. |
| 7,539,619 B1 | 5/2009 | Seligman et al. |
| 7,657,006 B2 | 2/2010 | Woodring |
| 7,711,543 B2 | 5/2010 | Bangalore et al. |
| 7,716,037 B2 | 5/2010 | Precoda et al. |
| 7,747,434 B2 | 6/2010 | Flanagan et al. |
| 7,974,842 B2 | 7/2011 | Helbing et al. |
| 8,209,176 B2 | 6/2012 | Bacchiani et al. |
| 8,249,870 B2 | 8/2012 | Roy et al. |
| 8,438,485 B2 | 5/2013 | Kulis et al. |
| 8,494,850 B2 | 7/2013 | Chelba et al. |
| 2004/0053592 A1* | 3/2004 | Reial ............... H04B 1/7113 455/303 |
| 2007/0143329 A1* | 6/2007 | Vigen ............... G06F 17/27 |
| 2008/0243473 A1* | 10/2008 | Boyd ............... G06F 17/28 704/2 |
| 2009/0083243 A1* | 3/2009 | Heymans ......... G06F 17/30669 |
| 2010/0198583 A1 | 8/2010 | Su et al. |
| 2013/0110492 A1 | 5/2013 | McGraw et al. |
| 2013/0151250 A1 | 6/2013 | VanBion |
| 2013/0173264 A1 | 7/2013 | Kiss et al. |

OTHER PUBLICATIONS

Rangarajan Sridhar et al., "Segmentation Strategies for Streaming Speech Translation," *Proceedings of NAACL-HLT 2013*, Association for Computational Linguistics, Jun. 9-14, 2013, pp. 230-238.

\* cited by examiner

SYSTEM AND METHOD FOR TRANSLATING REAL-TIME SPEECH USING SEGMENTATION BASED ON CONJUNCTION LOCATIONS

BACKGROUND

1. Technical Field

The present disclosure relates to translation of speech in real-time, and more specifically to segmentation of the speech for recognition and translation based on a location of conjunctions.

2. Introduction

Real-time translation of speech via an automatic speech recognizer and translator (machine translation) must balance two separate requirements: time and accuracy. If, for example, the automatic speech recognizer/translator system were to immediately produce translations after each word spoken, erroneous translations will occur because later words often affect the meaning and subsequent translation of a word. On the other hand, waiting until a perfect translation is available may require waiting until the speaker is finished speaking, an undesirable delay. Balancing latency and translation accuracy are therefore key to streaming speech translation.

DETAILED DESCRIPTION

A system, method and computer-readable media are disclosed which balance latency and accuracy of machine translations by segmenting the speech upon locating a conjunction. Exemplary conjunctions include "or" and "and." As an example, the system, upon receiving speech, will buffer the speech until an "and" or an "or" is detected. Upon detecting a conjunction, the speech received until that point is segmented to yield a segment. The system then continues performing speech recognition on the segment, searching for the next conjunction, while simultaneously initiating translation of the segment. Upon translating the segment, the system converts the translation to a speech output, allowing a user to hear an audible translation of the speech originally heard.

In certain configurations, in addition to searching for conjunctions, the system can segment speech based on time (i.e., how long has it been since a segment was generated), characters/phonemes detected (i.e., how many characters/words have been collected by the speech recognition mechanism), and punctuation (i.e., if a comma or sentence termination is determined). The system can also segment based on types of words, such as identifying pronouns, verbs, nouns, or other word types. In addition, segmentation can occur when recognizing proper names of people or places, or domain-specific words. In such configurations, the search for a conjunction can be in place of, or in addition to, the alternative segmentation strategies. For example, a system can employ a speech segmentation strategy which generates speech segments based on punctuation and, instead of recording time since the last segment, identifying conjunctions. Alternatively, the system can be configured such that it relies upon identification of one or more of punctuation, conjunctions, other words, and time.

The system adjusts the size of speech segments, and/or the rate of subsequent translation, in order to produce a constant stream of translated speech corresponding to the constant real-time speech received. Such adjustments can be made automatically by a processor, or can be manually adjusted by a user. If the system is translating a recorded video (for example, a YouTube video) which does not have an associated transcription, the system likewise seeks to produce constant speech corresponding to the speech of the video. Consider the example of a weatherman providing a live video report about a storm. A system receives the audio, searching for conjunctions and punctuations. Each time a conjunction or punctuation is detected by automatic speech recognition, the system creates a segment of the speech. Each segment includes speech from the end of the previous segment to the point where the conjunction or punctuation was detected. In the weatherman example, the system forms multiple segments as the weatherman is speaking, translates the segments, and produces audio translated speech corresponding to the weatherman's words. However, when a large gust of wind blows by, causing the weatherman to pause his speech momentarily, the system can create a similar pause in the translated output speech. As the weatherman resumes speaking, the system similarly resumes a constant output of translated speech. During the pause, the system can continue to process speech as disclosed herein.

By generating speech segments which are not solely based on time, length of characters received, or punctuation, but also the presence of conjunctions, the meanings of specific speech segments are less likely to be misinterpreted upon translation. In addition, breaking up the speech using conjunctions allows a constant flow of speech, reducing the latency of translation and providing an improved machine translation experience. To minimize latency, the various components after segmentation operate using synchronization. For example, upon generating the segment, the system translates the segment into the second language. Upon obtaining the translation, the system produces output speech corresponding to the translation. If any preprocessing needs to occur prior to speech output (for example, gathering phonemes from a database, or modifications to gathered phonemes for accents, prosody, etc.), the system can utilize average preprocessing times in managing a constant output of translated audio.

In order to improve Automatic Speech Recognition (ASR) performance for a diverse data set, including live speech and recorded speech, adaptation techniques such as constrained model adaptation and vocal tract length normalization can be used. In order to improve machine translation performance, real-time, or near real-time, implementation of monotonic and partial translation retention can also be used. As various techniques of text segmentation are combined with segmentation using conjunctions, translation quality improves. Latency is similarly improved by synchronizing pipeline components (i.e., the components which run immediately upon a first component finishing).

An exemplary speech recognition component uses a three-pass decoding approach utilizing two acoustic models. The models use three-state left-to-right Hidden Markov Models (HMMs) representing just over 100 phonemes. The phonemes can represent English, or any other language, and include spelled letters and head-body-tail representation for the eleven digits (with "zero" and "oh"). In other languages, the phonemes can represent specific characters, intonations, and/or glyphs.

The ASR output for speech is a long string of words with no punctuation, capitalization or segmentation markers. In many offline ASR systems, the speech is first segmented into short utterance-like audio segments before passing them to the decoder. In a simultaneous speech translation system, where speech is translated while being spoken, one can neither find the optimal segmentation of the entire speech nor tolerate high latencies associated with long segments. Consequently, it can be necessary to decode the incoming audio incrementally as well as segment the ASR hypotheses appropriately to maximize machine translation quality. This disclosure presents a variety of linguistic and non-linguistic segmentation strategies for segmenting the source text input (recovered from the ASR) into MT.

The simplest method is to segment the incoming text according to length in number of words. Such a procedure can destroy semantic context but has little to no overhead in additional processing. Using this method, the text can be segmented into exemplary windows of 4, 8, 11, and 15 words. Alternatively, an entire speech or video can be grouped into a single segment (or chunk).

Another method segments the input text using a hold-output model. Given a pair of parallel sentences, the model segments the source sentence into minimally sized chunks such that crossing links and links of one target word to many source words in an optimal GIZA++ alignment occur only within individual chunks. The motivation behind this model is that if a segment $s_0$ is input at time $t_0$ to an incremental MT system, it can be translated right away without waiting for a segment $s_i$ that is input at a later time $t_i$; $t_i>0$. The hold-output model detects these kinds of segments given a sequence of English (or other language) words that are input from left to right.

A hold-output model can be developed using a kernel-based support vector machine (SVM). The SVM tags a token t in the input with either the label HOLD, meaning to chunk it with the next token, or the label OUTPUT, meaning to output the chunk constructed from the maximal consecutive sequence of tokens preceding t that were all tagged as HOLD. The model considers a five word and part of speech (POS) window around the target token t. Unigram, bigram, and trigram word and POS features based upon this window are used for classification. Training and development data for the model can be derived from the $1^{st}$ language to $2^{nd}$ language training data (for example, English to Spanish) after running it through GIZA++.

Another segmentation method is segmenting source text into sentences, and/or further segmenting the sentence segments based on comma chunks within the sentences. These tasks are performed by training a kernel-based SVM on a subset of English language data. An exemplary model for this segmentation can be made using human-transcribed speeches to collect the words and identify sounds associated with punctuation. The punctuations identified can then be normalized by transforming different kinds of sentence ending punctuations into a uniform end of sentence marker. Likewise, the system can normalize double-hyphens by transforming the double-hyphens into commas. Commas already existing in the input can be kept while all other kinds of punctuation symbols were deleted. A part of speech (POS) tagger can be applied to input used to derive the punctuation data. For speed, a unigram POS tagger can be implemented which is trained on the Penn Treebank (see Marcus et al., 1993) and using orthographic features to predict the POS of unknown words. The SVM-based punctuation classifier can rely on a five word and POS window in order to classify the target word. Unigram, bigram, and trigram word and POS features based on classified windows can be used for classification. Using this method, data sets pred-sent (sentences) and pred-punct (comma separated chunks) can be obtained. Corresponding to these, two other data sets ref-sent and ref-punct can be obtained using gold-standard punctuations (higher-threshold certainty punctuations) in the speech being received.

Yet another method of segmenting text identified by the ASR is conjunction-word based segments. These segments are separated at either conjunction (e.g. "and," "or") and/or sentence ending word boundaries. Conjunctions can be identified using the unigram POS tagger. This method is the focus of this disclosure.

Another method includes text chunking performed within each sentence, with each chunk corresponding to one segment. Text chunks are non-recursive syntactic phrases in the input text. Using this method, the source text is segmented into text chunks using TreeTagger, a decision-tree based text chunker. Initial sets of text chunks can be created by using either gold-standard sentence boundaries (sentence-boundaries having a high confidence threshold) or boundaries detected using the punctuation classifier, yielding the data sets chunk-ref-punct and chunk-pred-punct. Chunk types included NC (noun chunk), VC (verb chunk), PRT (particle), and ADVC (adverbial chunk).

Because these chunks may not provide sufficient context for translation, one can also concatenate neighboring chunks of certain types to form larger chunks. These larger chunks can capture as single chunks instances of subject and verb. In addition, data sets chunks such as PC (prepositional phrase) and VC followed by VC (control and raising verbs). Finally, data sets can capture as single chunks VC followed by NC and optionally followed by PRT (verb and its direct object).

Applying the conjunction segmenter after the aforementioned punctuation classifier in order to detect the ends of sentences yields the data set conjpred-eos. Applying the conjunction segmenter on sentences derived from the gold-standard punctuations yields the data set conjref-eos. Finally, applying the hold-output model to sentences derived using the punctuation classifier produces the data set pred-hold. Obtaining English sentences tagged with HOLD and OUTPUT directly from the output of GIZA++ on English-Spanish sentences in the reference produces the data set ref-hold. The strategies containing the keyword ref for ASR simply means that the ASR hypotheses are used in place of the gold reference text.

Real-time speech translation can also be made by using incremental speech recognition, i.e., the decoder returns partial hypotheses that, independent of the pruning during search, will not change in the future.

The hold segmentation strategy yields the poorest translation performance. The scheme oversegments the text and, because the translation and language models are trained on sentence like chunks, the resulting performance is poor. For example, the input text "the sea" should be translated to Spanish as "el mar", but instead the hold segmenter chunks it as "the sea" which MT's chunk translation renders as "el_el mar."

The chunk segmentation strategy also yields a poor translation performance. In general, it does not make the same kinds of errors that the hold strategy makes; for example, the input text the sea will be treated as one NC chunk by the chunk segmentation strategy, leading MT to translate it correctly as "el mar." However, the short chunk sizes lead to other kinds of errors. For example, the input text we use will be chunked into the NC "we" and the VC "use", which will be translated incorrectly as "nosotros_usar"; the infinitive "usar" should be selected to form the properly conjugated form "usamos." However, there is a marked improvement in translation accuracy with increasingly larger chunk sizes. The conj-pred-eos and pred-punct strategies work the best, and it can be seen that the average segment length (8-12 words) generated in both these schemes is very similar to that used for training the models.

The average segment length (8-12 words) has approximately the average latency (4-5 seconds) tolerable in cross-lingual communication, also known as ear-voice span (Lederer, 1978). The non-linguistic segmentation using fixed word length windows also performs well, especially for the longer length windows. However, longer windows (for example, over 15 words) increase the latency and any fixed length window typically destroys the semantic context. In addition, translating the complete speech is suboptimal in comparison with segmenting the text. This is primarily due to bias on sentence length distributions in the training data.

The performance of the real-time speech translation of recorded speech (such as YouTube videos, TED talks, personal videos, etc.) is much lower than offline scenarios. First, only a VTLN model is used to perform CMA adaptation in a real-time scenario, typically increasing latency. Second, the ASR language model is trained on sentence-like units. Subsequent decoding the entire speech with this LM is not optimal. A language model trained on complete speeches will be more appropriate for such a framework.

Comparing the accuracies of different speech translation strategies, pred-punct performs the best. When embedded in an incremental MT speech recognition system, systems are more accurate which send partial ASR hypotheses directly to MT. This advantage decreases, however, when the ASR timeout parameter is increased to more than five or six seconds. In terms of latency, the addition of the pred-punct segmenter into the incremental system introduces a significant delay. About one third of the increase in delay can be attributed to merely maintaining a two word lookahead window that the segmenter's classifier needs to make decisions. The remaining delay can be attributed to the long chunk sizes that the segmenter produces.

Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of specific embodiments will then follow. These variations shall be described herein as the various embodiments are set forth. The disclosure now turns to FIG. 1.

Figure 1:
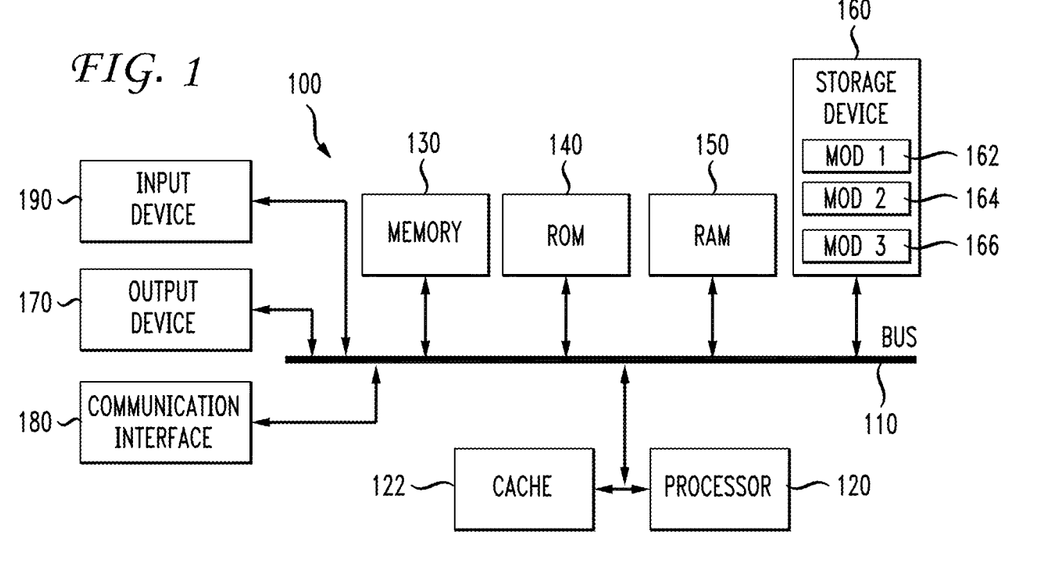
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
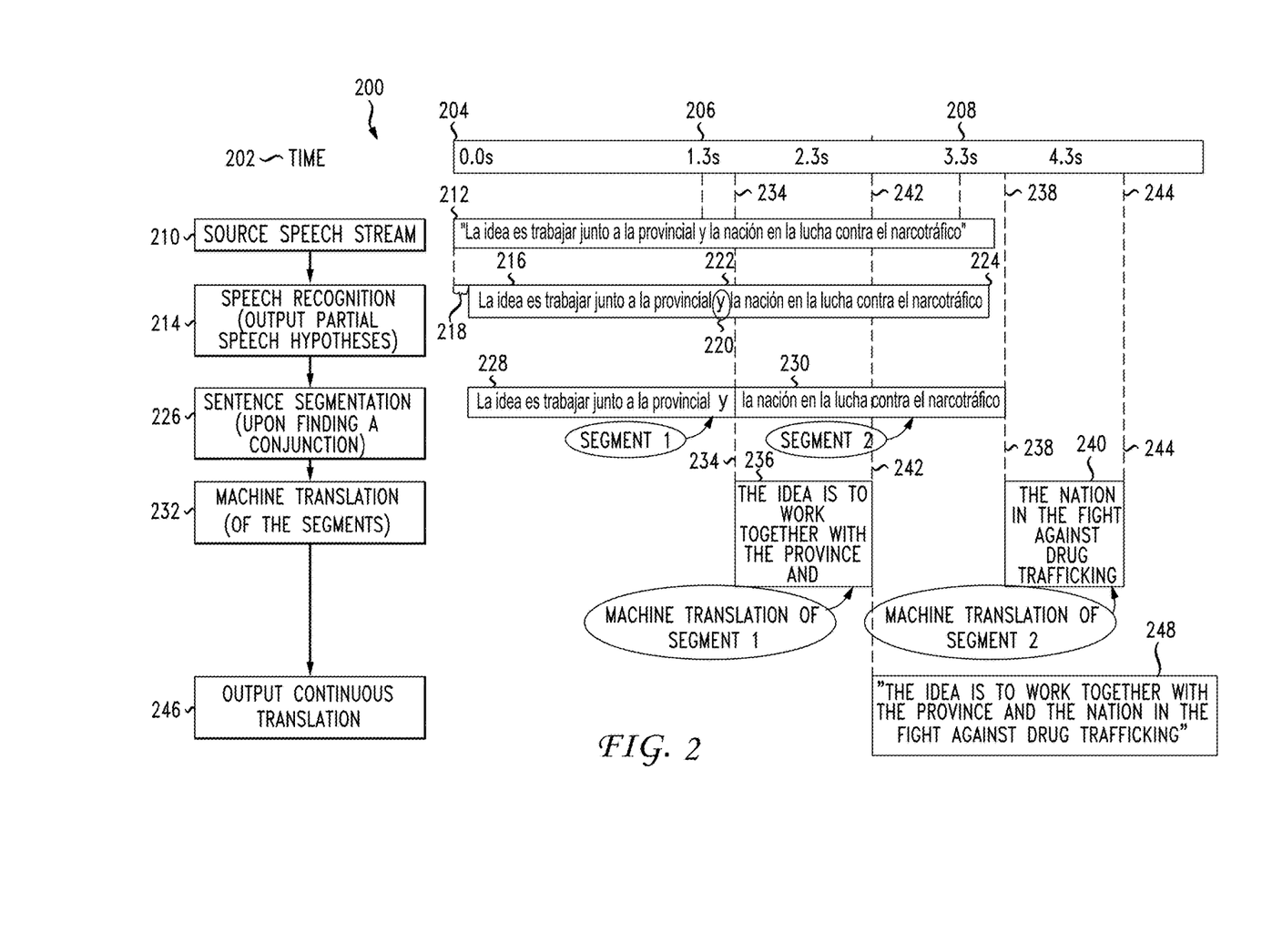
FIG. 2 illustrates a timeline of a machine translation embodiment.

Having disclosed some components of a computing system, the disclosure turns to FIG. 2, which illustrates a timeline of a machine translation embodiment 200. As speech 212 is received, time 202 progresses from left to right, beginning at time 0.0 seconds 204. Boxes 210, 214, 226, 232, and 246 align with the speech processing being performed. For example, the source speech stream 210 indicates that the system is receiving a stream of speech 212. In the illustrated example, the stream of speech 212 is "La idea es trabajar junto a la provincial y la nación en la lucha contra el narcotráfico." The system begins receiving the stream of speech 212 at time 0.0 seconds 204, and continues receiving speech until time 3.3 seconds 208. Times, language, and other characteristics of the speech are given solely for the purposes of example, and should not be considered limiting.

As the system receives the stream of speech 212, the system is performing automatic speech recognition 214 on the stream of speech 212. The automatic speech recognition process 214 produces, via a speech recognizer, partial speech hypotheses 216. The slight offset 218 illustrated between the stream of the speech 212 and the partial speech hypotheses 216 represents the time required for the system to perform speech recognition on the received speech and produce a text hypotheses of the speech received.

In addition to recognizing the speech, the system is also searching for text indicating a portion of the transcribed text should be segmented. In the example 200, the system is searching for the conjunctions "and" and "or," which in Spanish are "y" and "o." At time 1.3 s 206, the system "hears", or detects, the "y", and recognizes, or detects, the conjunction "y" 220 at time 222. The system then performs sentence segmentation 226 on the text hypotheses 216 identified up to time 222, resulting in a segment 228. The segment consisting of the beginning of the sentence to the conjunction, is referred to as segment 1 228, and includes text associated with the speech originally received, beginning with "La" and going to "y."

Immediately upon segmenting the segment 1 (at time 234), the system begins machine translation 232 on segment 1. As illustrated, this process 232 begins at time 234 and ends at time 242 with a machine translation of segment 1 236, which is translated text corresponding to segment 1. Continuing with the example, the machine translation produces "The idea is to work together with the province and" as text corresponding to segment 1. Upon producing the machine translation of segment 1 at time 242, the system immediately begins to output 246 an audio version of the machine translation.

Returning to the speech recognizer 214, after the conjunction "y" 220 is recognized the system continues to receive speech 212, requiring the speech recognizer 214 to continue outputting hypotheses. These remainder hypotheses can include words, sentences, paragraphs, or larger portions of speeches/talks/audio recordings. In our example 200, the remainder speech is "la nación en la lucha contra el narcotráfico," ending at time 3.3 seconds 208. At time 224 the speech recognizer 214 outputs the last of the hypotheses. The system's segmenter 226, instead of finding a conjunction, identifies the end of the speech as a likely end of a sentence, and segments the text hypothesis "la nación en la lucha contra el narcotráfico" as a second segment 230. The system, upon identifying the second segment 230 at time 238, immediately begins machine translation 232 of the second segment 241. The machine translation 232 of the second segment results in a machine translation of segment 2 240, which the system completes at time 244.

The audible translation output 246 of the machine translation of segment 1 236, followed by the audible translation output 246 of the machine translation of segment 2 240, is continuous. That is, the translated speech output 248 heard by a user should have be continuous, similar to the original, untranslated, source speech stream 212. If there are pauses in the source speech stream 212, the audible translation 248 can have similar pauses. The process of receiving speech, producing segments, translating the segments, and generating an audible translation of the speech continues while speech is being received. Various configurations can rely upon segmentation using conjunctions, determined punctuation (commas, sentences, paragraphs, semi-colons, colons, etc.), words received, time passed, or any other segmentation strategy. These segmentation strategies can be combined or excluded as necessary, based on processing capacity, production of constant audio output, accuracy, and latency.

Figure 3:
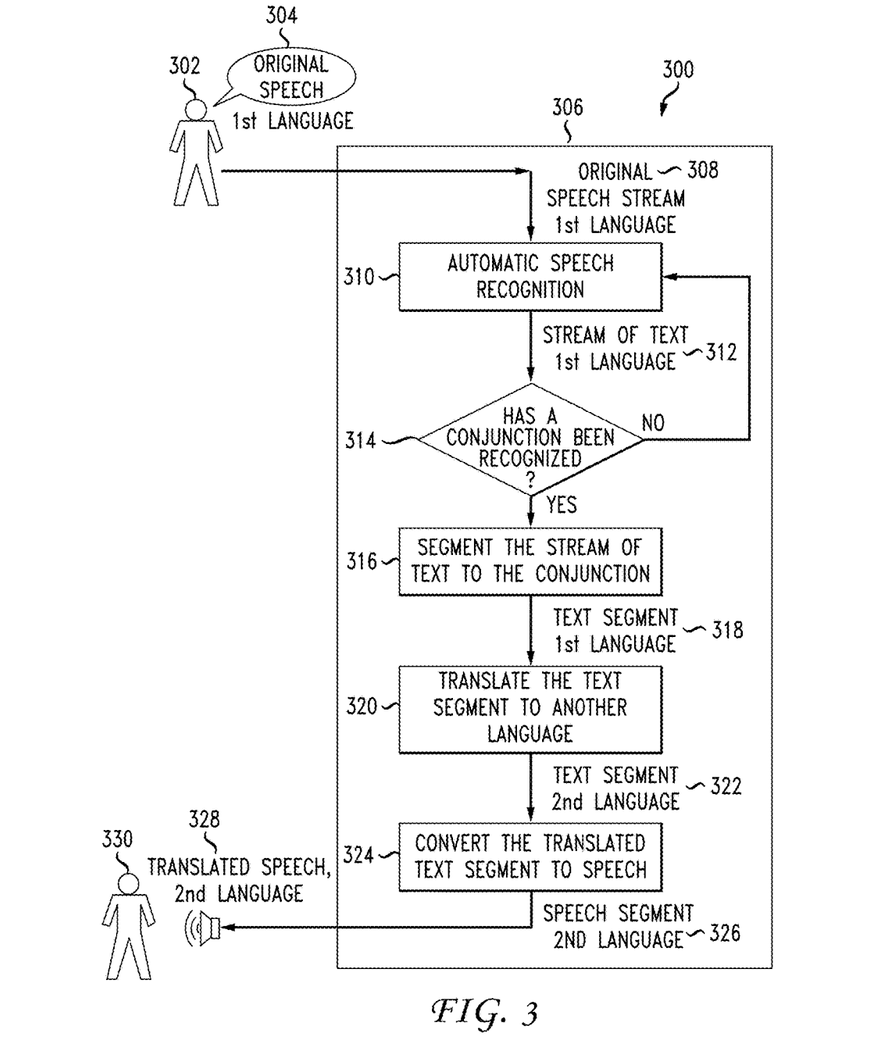
FIG. 3 illustrates a decision tree of a machine translation embodiment.

FIG. 3 illustrates a decision tree of a machine translation embodiment 300. A first user 302 produces original speech 304 in a first language. In other configurations, the original speech 304 can be received from a recording, such as a video or audio file, or from a stream of speech (for example, audio streaming over the Internet). The original speech 304 is received by the system 306, which treats the original speech 304 as an original speech stream in a first language 308. The original speech stream in the first language 308 is subject to automatic speech recognition 310, producing a stream of text in the first language 312. If a conjunction (and/or other segmentation requirement, such as punctuation, specific words, types of words, etc.) has been recognized 314, identified, or detected, the system segments the stream of text up to the conjunction 316. If the segmentation requirement (such as a conjunction) has not been met, i.e., "No", the system continues to perform automatic speech recognition 310 until such a requirement is met.

When the system segments the stream of text to the conjunction 316, the system produces a text segment in the first language 318. The system then translates the text segment from the first language to another language 320, resulting in the text segment in a second language 322. This text segment in the second language 322 is then converted to speech 324, resulting in a speech segment in the second language 326, which is output to a second user 330 as audible translated speech 328. Using this system 300, the second user 330 can hear a continuous, accurate translation of the original speech 304 spoken by the first user 302 shortly after the original speech 304 is spoken.

Having disclosed some basic system components and concepts, the disclosure now turns to the exemplary method embodiment shown in FIG. 5. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

Figure 4:
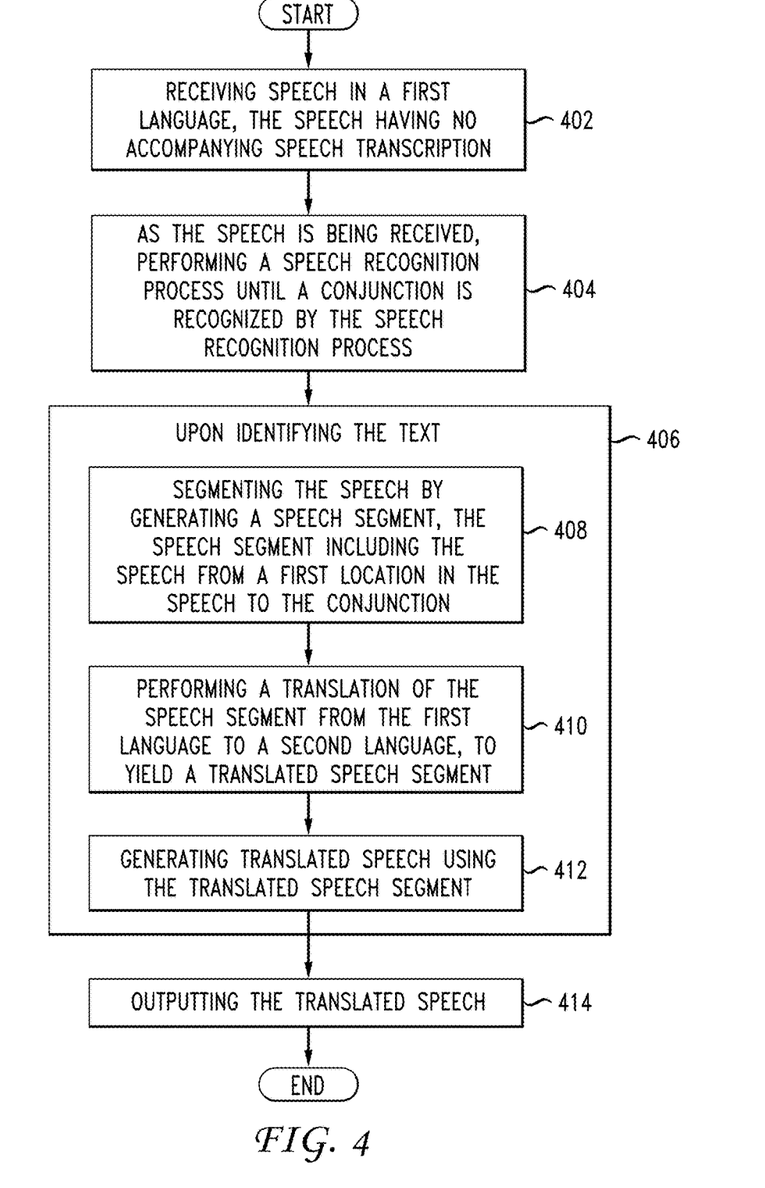
FIG. 4 illustrates an example method embodiment.

The system 100 receives speech in a first language, the speech having no accompanying speech transcription (402). Examples of such speech include audio of a speaker, or audio corresponding to a recorded video having no accompanying transcription. As the speech is being received, the system 100 performs speech recognition until a conjunction is recognized by the speech recognition process (404). In other configurations, in addition to conjunctions, the system can search for punctuation, a defined number of recognized words, an elapsed period of time without segmentation, or any other segmentation qualification.

Upon identifying a particular text (406), such as a name, place, or a conjunction, the system 100 segments the speech by generating a speech segment, the speech segment consisting of speech from a first location in the speech to the conjunction. (408). The first location can be the location of a previous conjunction, the start of the speech, the end of a previous sentence, or the end of another segment. The system 100 then performs a translation of the speech segment from the first language to a second language, generating a translated speech segment (410). The translation can be accomplished using a lookup system, where the identified words within the speech segment are identified using a translation table, list, and/or lattice. The system 100, upon generating the translated speech segment, outputs the translated speech audibly (414) in the second language.

Exemplary conjunctions include "or", "and", "but", or other conjunctions used to link independent clauses in a compound sentence. In certain embodiments, only a single conjunction (rather than the whole list) can be searched for. For example, only "or" or only "and" can be sought for. Likewise, systems can employ other segmentation strategies including searching for punctuation (such as commas, exclamations, semicolons, colons, sentences, particular words, types of words, words belonging to a particular domain, and paragraphs), number of words identified since the last segment, a time since the last segment, accuracy, and latency. Searching for punctuation can be performed using a punctuation classifier, which can be a separate modules, process, or device. Each of these segmentation strategies can be used with or in place of the conjunction searching strategy.

A segmentation strategy based on types of words other than conjunctions can search for pronouns, adverbs, verbs, nouns, or any other part of speech. Similarly, a segmentation strategy can search for specific words, such as specified proper names of individuals, places, or items, and upon identifying the specific words generate speech segments. Such configurations can be dynamic, changing which types of words, or which specific words, are searched for based on processing capacity, latency, and/or accuracy. Such configurations can also add and remove words searched for based on context. For example, if an individual is using a number of words associated with a domain, such as a domain for a specific topic, the system can identify words in that domain which, even though they have not yet been detected, will produce a segment upon being identified. Similarly, if a user repeatedly speaks a name, such as "John," the system can identify this repetition and initiate segmentation based on the identification of the repeated name. Such identification of segmentation words upon repetition includes segmentation by conjunctions, time between segments, length of words, and the detection of proper names of individuals, places, parts of speech, types of words, and/or words specific to a domain or topic.

Regarding accuracy and latency segmentation strategies, these strategies can work in conjunction with the conjunction strategy to ensure the user is receiving speech within an accuracy threshold and a latency threshold. For example, if the system 100 determines the latency is above a threshold (meaning the second user is not receiving the translated speech output within a determined amount of time) the segments will be shortened in length. Such shortening can occur by increasing the amount of punctuation searched for, the conjunctions searched for, or by decreasing the maximum amount of words received before segmentation occurs. Likewise, if the system 100 determines the accuracy of the translation output is below a threshold, the system can increase the segment lengths by reducing punctuation/conjunctions/words searched for and increasing a maximum number of words per segment. Accuracy of speech output can be based on confidence of the translation, and can be calculated based on translated words already output as translated speech, translated words which are about to be output, or based on rolling average of confidence levels.

While the system 100 can be used to translate between any two spoken languages, the following list of languages are specifically enumerated as potential languages for use with the system 100: Mandarin, Wu (Chinese), English, Spanish, Arabic, Bengali, Hindi, Russian, Portuguese, Japanese, German, Korean, French, Italian, Persian, Dutch, Swedish, Panjabi, and Polish.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to speech segmentation of audio, regardless of source. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
receiving speech in a first language, the speech having no accompanying speech transcription, wherein the speech has a first portion, a second portion, and a conjunction which separates the first portion from the second portion;
as the speech is being received, performing, via a processor, a speech recognition process on the first portion of the speech until the conjunction is recognized by the speech recognition process; and
upon identifying the conjunction:
(1) segmenting the speech by generating a speech segment, the speech segment comprising the first portion of the speech to the conjunction;
(2) performing a translation of the speech segment from the first language to a second language, to yield a translated speech segment; and
(3) receiving the second portion of the speech;
generating translated speech using the translated speech segment, wherein the translated speech is generated with an accuracy;
when the accuracy is below a threshold, increasing segment lengths by reducing conjunctions searched for, increasing a maximum number of words per segment, and identifying a second conjunction which defines a new first portion of the speech and a new second portion of the speech;
upon identifying the second conjunction:
(1) segmenting the speech by generating a new speech segment, the new speech segment comprising the new first portion of the speech to the second conjunction;
(2) performing a translation of the new speech segment from the first language to the second language, to yield a new translated speech segment; and
(3) receiving the new second portion of the speech; and
outputting the new translated speech segment.

2. The method of claim 1, wherein the conjunction comprises one of "and" and "or".

3. The method of claim 2, wherein the speech recognition process comprises identifying punctuation using a punctuation classifier.

4. The method of claim 1, further comprising repeating the segmenting, the performing, the generating, and the outputting with respect to the second portion of the speech.

5. The method of claim 1, wherein the processor searches for fewer conjunctions when an accuracy is above a threshold.

6. The method of claim 1, further comprising outputting additional translated speech immediately after the outputting of the translated speech such that an output break between the translated speech and the additional translated speech matches a pause in the speech corresponding to an input break between the first portion and the second portion of the speech.

7. A system comprising:
a processor; and
a computer-readable storage medium having instructions stored which, when executed by the processor, cause the processor to perform operations comprising:
receiving speech in a first language, the speech having no accompanying speech transcription, wherein the speech has a first portion, a second portion, and a conjunction which separates the first portion from the second portion;
as the speech is being received, performing, a speech recognition process on the first portion of the speech until the conjunction is recognized by the speech recognition process; and
upon identifying the conjunction:

(1) segmenting the speech by generating a speech segment, the speech segment comprising the first portion of the speech to the conjunction;
(2) performing a translation of the speech segment from the first language to a second language, to yield a translated speech segment; and
(3) receiving the second portion of the speech;
generating translated speech using the translated speech segment, wherein the translated speech is generated with an accuracy;
when the accuracy is below a threshold, increasing segment lengths by reducing conjunctions searched for, increasing a maximum number of words per segment, and identifying a second conjunction which defines a new first portion of the speech and a new second portion of the speech;
upon identifying the second conjunction:
(1) segmenting the speech by generating a new speech segment, the new speech segment comprising the new first portion of the speech to the second conjunction;
(2) performing a translation of the new speech segment from the first language to the second language, to yield a new translated speech segment; and
(3) receiving the new second portion of the speech; and outputting the new translated speech segment.

8. The system of claim 7, wherein the conjunction comprises one of "and" and "or".

9. The system of claim 8, wherein the speech recognition process comprises identifying punctuation using a punctuation classifier.

10. The system of claim 7, further comprising repeating the segmenting, the performing, the generating, and the outputting with respect to the second portion of the speech.

11. The system of claim 7, wherein the processor searches for fewer conjunctions when an accuracy is above a threshold.

12. The system of claim 7, the computer-readable storage medium having instructions stored which result in the operations further comprising outputting additional translated speech immediately after the outputting of the translated speech such that an output break between the translated speech and the additional translated speech matches a pause in the speech corresponding to an input break between the first portion and the second portion of the speech.

13. A computer-readable storage device having instructions stored which, when executed by a computing device, cause the computing device to perform operations comprising:

receiving speech in a first language, the speech having no accompanying speech transcription, wherein the speech has a first portion, a second portion, and a conjunction which separates the first portion from the second portion;
as the speech is being received, performing, a speech recognition process on the first portion of the speech until the conjunction is recognized by the speech recognition process; and
upon identifying the conjunction:
(1) segmenting the speech by generating a speech segment, the speech segment comprising the first portion of the speech to the conjunction;
(2) performing a translation of the speech segment from the first language to a second language, to yield a translated speech segment; and
(3) receiving the second portion of the speech;
generating translated speech using the translated speech segment, wherein the translated speech is generated with an accuracy;
when the accuracy is below a threshold, increasing segment lengths by reducing conjunctions searched for, increasing a maximum number of words per segment, and identifying a second conjunction which defines a new first portion of the speech and a new second portion of the speech;
upon identifying the second conjunction:
(1) segmenting the speech by generating a new speech segment, the new speech segment comprising the new first portion of the speech to the second conjunction;
(2) performing a translation of the new speech segment from the first language to the second language, to yield a new translated speech segment; and
(3) receiving the new second portion of the speech; and outputting the new translated speech segment.

14. The computer-readable storage device of claim 13, wherein the conjunction comprises one of "and" and "or".

15. The computer-readable storage device of claim 14, wherein the speech recognition process comprises identifying punctuation using a punctuation classifier.

16. The computer-readable storage device of claim 13, further comprising repeating the segmenting, the performing, the generating, and the outputting with respect to the second portion of the speech.

17. The computer-readable storage device of claim 13, wherein the computing device searches for fewer conjunctions when an accuracy is above a threshold.

* * * * *